United States Patent
Bellingham et al.

(10) Patent No.: US 11,023,417 B2
(45) Date of Patent: Jun. 1, 2021

(54) VIDEO CONTENT GRAPH INCLUDING ENHANCED METADATA

(71) Applicant: Home Box Office, Inc., New York, NY (US)

(72) Inventors: Gregory John Bellingham, Seattle, WA (US); William A. McNamara, Bellevue, WA (US); Brandon C. Furtwangler, Issaquah, WA (US)

(73) Assignee: HOME BOX OFFICE, INC., New York, NY (US)

( * ) Notice: Subject to any disclaimer, the term of this patent is extended or adjusted under 35 U.S.C. 154(b) by 184 days.

(21) Appl. No.: 15/608,530

(22) Filed: May 30, 2017

(65) Prior Publication Data

US 2018/0349368 A1 Dec. 6, 2018

(51) Int. Cl.
*G06F 16/16* (2019.01)
*H04N 21/236* (2011.01)
*H04N 21/482* (2011.01)
*H04N 21/235* (2011.01)
*H04N 21/858* (2011.01)
(Continued)

(52) U.S. Cl.
CPC ............. *G06F 16/164* (2019.01); *G06F 5/12* (2013.01); *H04N 21/235* (2013.01); *H04N 21/236* (2013.01); *H04N 21/23614* (2013.01); *H04N 21/4722* (2013.01); *H04N 21/4828* (2013.01); *H04N 21/84* (2013.01); *H04N 21/8456* (2013.01); *H04N 21/858* (2013.01); *H04L 65/607* (2013.01)

(58) Field of Classification Search
CPC .... G06F 3/0482; G06F 16/635; G06F 3/0481; G06F 16/164; G06F 16/435; G06F 16/9535
See application file for complete search history.

(56) References Cited

U.S. PATENT DOCUMENTS 8,176,518 B1 * 5/2012 Junkin .................... A63F 13/63
725/61
2005/0060757 A1 3/2005 Suh
(Continued)

FOREIGN PATENT DOCUMENTS

EP 1443768 A1 8/2004

OTHER PUBLICATIONS

International Search Report and Written Opinion for International Application Serial No. PCT/US2018/030718 dated Oct. 2, 2018, 18 pages.
(Continued)

*Primary Examiner* — Truong V Vo
(74) *Attorney, Agent, or Firm* — Amin, Turocy & Watson, LLP

(57) ABSTRACT

The described technology is directed towards sending metadata related to a video to a client device, such as events that describe a portion of that video, such as in a hidden stream. In one or more implementations, the enhanced metadata comprises nodes used to build part of a relationship graph. This allows interested clients to switch between the feature playback and interacting with the metadata. Further, searches through the enhanced metadata may be performed to find matching video portions, and summaries or highlights of one or more videos may be assembled by accessing information in the enhanced metadata.

21 Claims, 11 Drawing Sheets

(51) Int. Cl.
*H04N 21/4722* (2011.01)
*H04N 21/84* (2011.01)
*G06F 5/12* (2006.01)
*H04N 21/845* (2011.01)
*H04L 29/06* (2006.01)

(56) References Cited

U.S. PATENT DOCUMENTS

| | | | |
|---|---|---|---|
| 2012/0311094 A1* | 12/2012 | Biderman | H04N 5/783 709/219 |
| 2014/0267337 A1 | 9/2014 | Keohane et al. | |
| 2015/0378998 A1* | 12/2015 | Houh | G06F 16/639 707/706 |
| 2016/0050467 A1 | 2/2016 | Candelore | |
| 2016/0127440 A1* | 5/2016 | Gordon | H04L 65/601 709/219 |
| 2016/0198239 A1* | 7/2016 | Shenkler | H04W 4/80 725/10 |
| 2017/0104838 A1 | 4/2017 | Busayarat et al. | |

OTHER PUBLICATIONS

International Preliminary Report on Patentability received for PCT Application Serial No. PCT/US2018/030718 dated Dec. 12, 2019, 10 pages.

\* cited by examiner

VIDEO CONTENT GRAPH INCLUDING ENHANCED METADATA

BACKGROUND

Client users often interact with information via user interfaces, such as menus of data items (e.g., buttons, tiles, icons and/or text) by which a client user may make a desired selection. For example, a client user may view a scrollable menu containing data items representing video content offered by a content provider, such as movies or television shows, and interact with the menu items to select a movie or television show for viewing.

In general, only relatively basic information is made available to users. For example, in a video selection-related example, in addition to a movie's title, a movie's associated data may (or may not) include a rating, an image that represents the movie, a plot summary, major cast and crew information and so on, which a user may wish to have in deciding whether to select content for viewing.

Some users may desire more information, and not only for making a selection decision. For example, devoted fans of a particular weekly television series will likely select and watch the next episode regardless, but further may be interested in additional content, such as actor interviews, stories, information regarding actual film locations and the like. At present, however, such users generally need to separately browse the internet to look for what they hope is available from some other third party source or sources.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more aspects of the technology described herein are directed towards relating portions of a video with subsets of enhanced metadata, in which each subset of the enhanced metadata describes at least one action in a corresponding portion of the video. Aspects include streaming the video to a client device, determining which portion of the video is being streamed, selecting a selected subset of the enhanced metadata that corresponds to the portion of the video being streamed, and downloading the selected subset of the enhanced metadata to the client device.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
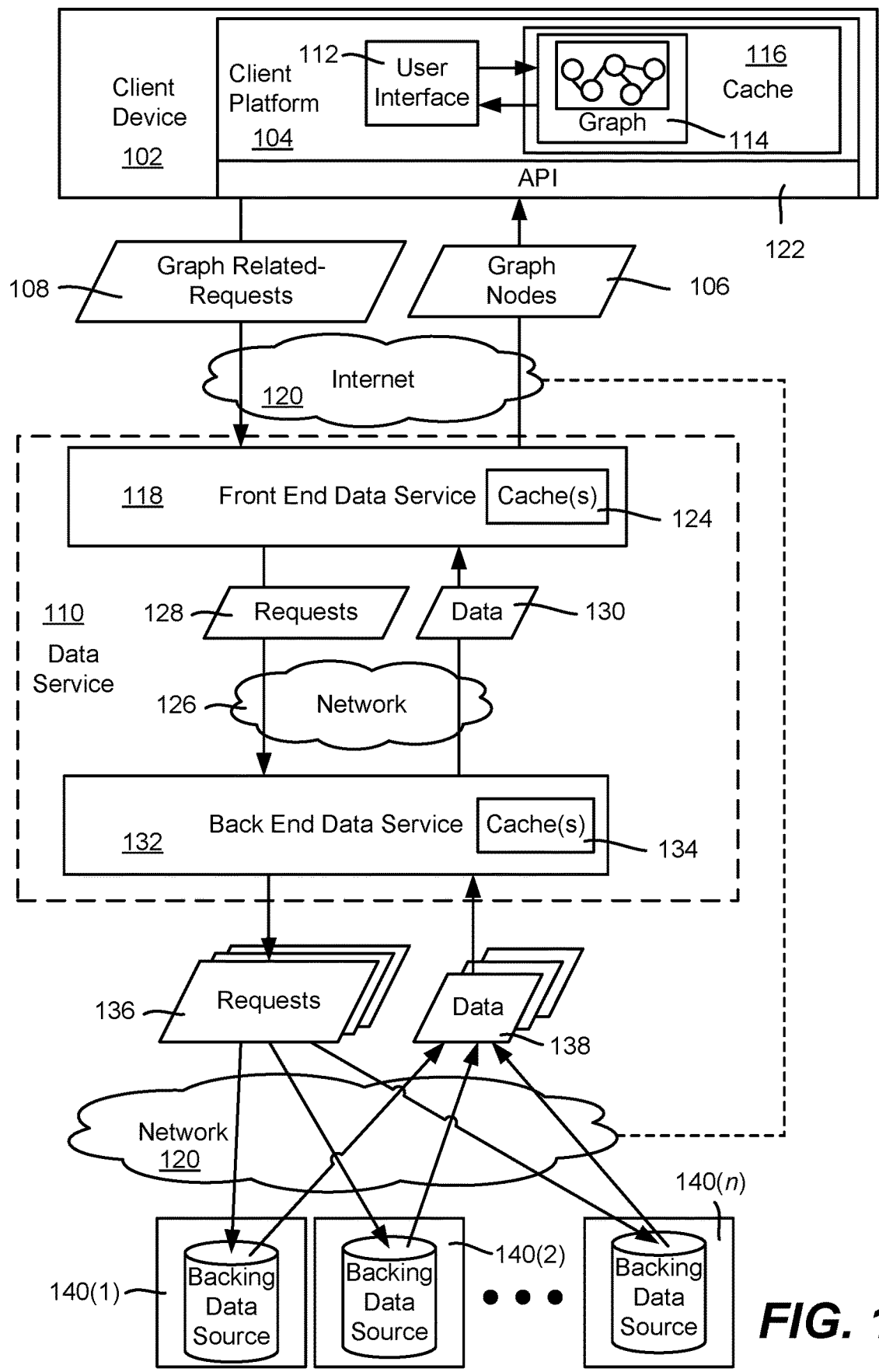
FIG. 1 is an example block diagram representation of a client device communicating with a data service to obtain data corresponding to graph nodes, including enhanced metadata nodes, with which a client user may interact, according to one or more example implementations.

Various aspects of the technology described herein are generally directed towards maintaining various data for client interaction as a graph of nodes and edges, and enhancing that graph with enhanced metadata in some manner that is likely desirable to users. For example, once a piece of video content (e.g., a movie or a television episode (sometimes referred to as a feature), a documentary, user uploaded content and the like) is selected for viewing, enhanced metadata related to that content may be downloaded as an enhanced metadata node set (one or more nodes) to a client device to provide an enhanced interactive experience corresponding to that content. As a more particular example, descriptive information associated with actual video frames (e.g., a romantic interlude, a fight, etc.) of some portion of video content (e.g., a series of frames) may have one or more enhanced metadata nodes that streamed to a client device in association with the video; one or more such nodes may link to other informational nodes, e.g., interviews of actors who appear in that video portion, real or fictional maps related to that video portion, camera cut data and so on. These other informational nodes may link to still other nodes and so on. Thus, a video may have data corresponding thereto maintained as an enhanced, interactive metadata graph node set, with any portion of the video typically having a corresponding associated enhanced metadata graph node subset, which may further have links (via node edges) to related data.

In one or more aspects, the enhanced, additional amounts of data such as related to video content are made available to client users by downloading the metadata, e.g., in a hidden stream accompanying a selected video. Such accompanying enhanced metadata generally corresponds to the video content and is typically information that is supported and managed by the content provider, although some information may be externally provided. The hidden, generally parallel data stream to the video stream avoids having to download possibly large amounts of data before the video can be played, which may delay playback. The hidden stream may be a separate stream, and/or accompanying packet header data or the like can specify whether a received block of data is video playback data or some enhanced metadata.

By way of an example of enhanced metadata, instead of providing only traditional metadata (such as title, image URLs, rating, credits and so forth) for selection of a feature, once the feature is selected, in addition to the actual video, more complex and possibly uncharacteristic metadata related to characters, events, maps, folklore, backstories and so forth may be downloaded as well. This allows interested clients to explore more information, as well as to play the video and switch between viewing the video playback in regular playback mode and interacting with the metadata. For example, a viewer of a particular episode may interact to pause playback and view a map of the relevant scene sites, see what other features a particular actor in a current scene is in, and so on. Alternatively, a viewer may dedicate and/or overlay portions of the viewing screen (at least temporarily) with visible representations of enhanced metadata in order to view playback simultaneously with enhanced content.

Moreover, even without selecting a certain piece of content and/or any parallel (or pre-) downloading of enhanced metadata, a viewer may be allowed to search a data service for enhanced metadata related to some subset of the data service's overall available content. For example, a viewer may indicate a particular series, and search for episodes, scenes, cuts and/or events (e.g., within a cut) in which character X of that series participates in a swordfight. With such a search, the viewer may obtain a compilation of that character's swordfight events, such as relevant video portions individually selectable via an interactive list, or video portions more directly compiled into a continuous video stream for viewing all of them together (or viewing some further narrowed subset of them). Note that as used herein, video content may be divided in any number of ways, including arbitrary ways, and the terms that refer to such video content divisions, such as "chapter," "scene," "cut," "event" and so on are used herein in only a general sense, and are not intended to precisely convey any strict definitions as sometimes used in the film making arts.

In one example implementation, rich searches may be accomplished by having each event (or some events) comprise an enhanced metadata node tagged with information or linked to other information that describes the event. Note that "events" as used herein are generally a relatively fine level of granularity of video content; e.g., a cut may be made up of one or more events, a scene made up of one or more cuts, and so on up to some higher level such as an episode of a season of a series, the entire series itself, a movie chapter, the entire movie, a genre that contains the movie and like movies, and so on up to a data service's full set of available content. Notwithstanding, it is feasible to have subevents within an event, multiple cuts within an event, and so on, and even have something more granular than a subevent, e.g., down to a single video frame or image thereof.

In one or more implementations, a video portion (e.g., event) description may be generally described with nouns and verbs; e.g., series Z, season 2, episode 6, scene 8, cut 3, event 2: [character=A, character=B, location=castle . . . , action=argument, action=fight, action=swordfight, action=gore . . . ]. The nouns and verbs may have a limited vocabulary, with a larger number of search terms mapped to the vocabulary via a thesaurus, a dictionary or the like. Nouns may be tied to verbs so that search results are more accurate; using the above example, characters X, Y and Z may appear in an event in which characters X and Y participate in the swordfight but character Z does not, and thus a search of events with character Z's swordfights does not return this event if the nouns for characters X and Y are tied to the verb of swordfight, while character Z is not. Adjectives and/or adverbs also may be used, e.g., ["loud" dialog, "bloody" fight, etc.].

A scene cut and/or event typically has an associated location, but may not have an associated character; e.g., a stormy sea scene may foreshadow trouble ahead, possibly, but not necessarily, to one or more implied characters. Along with a location, a scene cut and/or event typically has an associated action, even if the node's identified action is "still," "camera pan," "camera zoom" or the like; e.g., a scene may show a peaceful meadow where little or no movement happens.

Note that while hierarchically-arranged data structures can provide some similar enhanced metadata and is thus one possible implementation, a graph generally allows for more flexibility by allowing any node to link to any other node and thus provide access to greater amounts of information. For example, the data service may link any metadata node to any other node representing content or enhanced content, including content that is made available and supported by the content provider (as opposed to independent third party sources, although possibly in conjunction with third party sources or possibly independently such as if the third party information is reliable and well-supported). As a more particular example, the content provider may provide enhanced content that allows viewing the same scene captured from multiple, different camera cuts, scenes that were filmed but removed from the publically released version, alternative scenes, scenes released in one country but not another, and so on. One way this may be accomplished is to have alternate metadata nodes for the same portion of content (e.g., a camera 1 event node and a camera 2 event node). Alternative scenes, cuts and/or events (e.g., different endings to a movie) may be made selectable to users, e.g., via information in a happy ending scene metadata node versus information in a sad ending scene metadata node. Ratings and the like versus a viewer's age or preference information may be used to automatically select a scene, cut or event instead of another, by referencing information in different metadata nodes containing information for that scene, cut or event.

With enhanced metadata, a viewer may choose to view only the highlights/summary of an episode, such as those selected by the director or possibly selected in some way by other viewers, including those with a similar profile/demographic. For example, with streaming video, there is some amount of information of viewers that is known to a content provider, such as chapter selections, rewind and fast forward data, previous searches and so on, as well as external information such as social media input. Viewers' behavior and feedback is often available that may be used to determine what other viewers consider to be most significant with respect to the highlights of an episode.

It should be understood that any of the examples herein are non-limiting. For instance, some of the examples refer to metadata related to client selection/searching of video content (including audio) from a streaming service that delivers movies, television shows, documentaries and the like. However, the technology described herein is independent of any particular type of content or metadata, and is also independent of any particular user interface that presents such metadata as visible representations of objects or the like. Thus, any of the embodiments, aspects, concepts, structures, functionalities or examples described herein are non-limiting, and the technology may be used in various ways that provide benefits and advantages in data communication and data processing in general.

In one or more implementations, a graph of nodes is built by each client, in which each graph node represents a part of the underlying data that is available via a data service; (as used herein a "graph" is formed by the relationships between nodes, regardless of whether visibly represented as nodes and edges). The set of nodes for a given client includes a subset of the available data service's data that are currently relevant to that client, e.g., those which the client user interface displays as well as typically some cached nodes that are not currently displayed, and possibly nodes that are not displayable but maintain data for other nodes.

Thus, based upon user interaction as well as automated processes, using the graph of related nodes, a client software platform makes requests for one or more graph nodes to obtain their data as needed. The client requests may be to a request handling portion of a data service, e.g., a client interfacing front-end data service coupled to the client via the internet. The front-end data service interprets each request and responds with the requested data, which in one or more implementations may be obtained from a front-end cache, or via a back-end data service, including from a back-end cache and/or backing data sources. In this way the client software builds relevant portion(s) of the client graph as needed, which in general is highly efficient with respect to resource usage and obtaining rapid responses. Note that graph nodes may be cached at the client, whereby when data is needed the client platform first may attempt to use client-cached data without making a request to the request handling portion of the data service.

FIG. 1 is a block diagram representing example components that may be used to handle client requests for graph nodes, including enhanced metadata nodes, to form a client graph. In general, the client graph comprises a set of user interface nodes that represent some interactive portion of a user interface, such as the nodes that represent a Root (Home) menu, a Genre menu, a Series menu, and so on. A client device may cache nodes that are not currently being used to represent interactive content, at least as memory allows. For example, a "Genre" menu with a corresponding genre node may contain a "Comedy" interactive element (having a corresponding comedy node) among other interactive elements; if the user navigates to a "Comedy" menu, and then back to the "Genre" menu, the Genre menu and its other child nodes may be cached to avoid re-downloading them as the user navigates among menus.

Note however that enhanced metadata nodes need not be downloaded at this time, (although exceptions may exist, such as for an extremely popular show or based on prior user behavior). Instead, like streaming video content, enhanced metadata nodes are downloaded when playback is chosen for a selected feature node or the like, or in response to a user search or other specific request.

As exemplified in FIG. 1, a client device 102 runs client platform software 104 that receives graph nodes 106, including via graph-related requests 108, from a data service 110. Note that the client device 102 initially may receive one or more starting nodes corresponding to typed nodes automatically, e.g., when the client user of the client device 102 authenticates with the data service 110. For example, when the user logs in on the client device 102, the client device 102 may receive a user graph node, a root graph node and so forth that the client platform software 104 expects upon successful authentication. In this way, the client platform 104 may present initial user interface elements by rendering a root menu or the like based upon the root node, such as a home/root menu, with buttons, icons, tiles and so forth by which a user can navigate to other locations. Note that because in one or more implementations the root graph node is the starting point for an interactive user interface 112, in addition to the root graph node one or more nodes referenced by the root graph node may be automatically communicated to the client in advance. Note however that this is only one possible optimization, and alternatively the client device may be configured to make requests for any needed data, including the root graph node at start up, as well as nodes that are children of the root graph node, and so on.

In one or more implementations, the client software program's UI elements or the like may make requests for data items to the client platform (e.g., at a data service level) without needing to know about nodes or how the underlying data is maintained, organized, retrieved and so forth. For example, a tile object that represents a television show may in a straightforward manner send a request to the client platform software for a title corresponding to a title ID (which in one or more implementations is also the graph node ID), and gets the title back. As will be understood, beneath the UI level, the client platform software obtains the title from a (feature type) graph node corresponding to that ID; the graph node data may be obtained from a client cache, but if not cached, by requesting the graph node from a data service, as described herein.

As set forth above, each node may reference one or more other nodes, which forms a graph 114 (e.g., generally maintained in a client cache 116 or other suitable data storage). The client graph 114 is built by obtaining the data for these other nodes as needed, such as when nodes are rendered as visible representations of objects on the interactive user interface 112. Example visible representations of graph node data may include menus, tiles, icons, buttons, text and so forth. Note that it is feasible to pre-cache one or more nodes before their actual need, such as based on statistically likelihood of being needed soon; e.g., when a node XYZ is downloaded, also get node EFG because many users that get node XYZ tend to want node EFG next.

Still further, as will be understood, certain graph nodes, typically enhanced metadata graph nodes, may be automatically streamed to the client device 102 in conjunction with video content. For example, some portion of the video content such as a certain scene may have enhanced metadata graph nodes that describe that particular portion automatically streamed to the client device 102 for inclusion in its graph. This allows a client user to switch to interacting in some way with the enhanced metadata graph nodes that are relevant to the video portion, without having to request those enhanced metadata graph nodes on demand; they are advantageously already present in the client device graph 114/cache 116 for highly efficient user interaction.

In general, the client graph 114 comprises a client-relevant subset of the overall data available from the data service 110; (the available data at the data service can be considered an overall virtual graph, regardless how actually maintained). Because in the client platform 104 the underlying data forms the client graph 114, at least part of which may be represented as elements on the user interface 112, a user can interact to receive data for any relationship that the data service 110 (e.g., of the streaming video service) has decided to make available, including relationships between very different kinds of data, and/or those that to some users may seem unrelated. Over time the data service 110 can add, remove or change such references as desired, e.g., to link in new relationships based upon user feedback and/or as new nodes and/or graph node types become available.

To obtain the nodes 106, the client platform 104 interfaces with the data service 110, e.g., via a client interfacing front-end data service 118, over a network such as the internet 120. An application programming interface (API) 122 may be present that may be customized for devices and/or platform software versions to allow various types of client devices and/or various software platform versions to communicate with the front-end data service 118 via a protocol that both entities understand.

The front-end data service 118 may comprise a number of load-balanced physical and/or virtual servers (not separately shown) that return the requested nodes 106, in a manner that is expected by the client platform software 104. Some of the requests for a graph node may correspond to multiple sub-requests that the client platform software 104 expects in a single graph node; for example, a request for a tile graph node that represents a feature (movie) may correspond to sub-requests for a title (in text), an image reference such as a URL, a rating, a plot summary and so on. A request for a user's "watch list" may correspond to sub-requests for multiple tiles. The data service 110 understands based upon each graph node's type how to obtain and assemble data sub-parts as needed, from possibly various sources, into a single graph node to respond to a client request for a graph node.

The corresponding graph node may be contained in one or more front-end caches 124, which allows like requests from multiple clients to be efficiently satisfied. For example, each load-balanced server may have an in-memory cache that contains frequently or recently requested data, and/or there may be one or more front-end caches shared by the front-end servers. The data is typically cached as a full graph node (e.g., a tile corresponding to data from multiple sub-requests), but it is feasible to cache at least some data in sub-parts that are aggregated to provide a full graph node.

Some or all of the requested data may not be cached (or may be cached but expired) in the front-end cache(s) 124. For such needed data, in one or more implementations, the front-end data service 118 is coupled (e.g., via a network 126, which may comprise an intranet and/or the internet) to make requests 128 for data 130 to a back-end data service 132.

The back-end data service 132 similarly may comprise a number of load-balanced physical and/or virtual servers (not separately shown) that return the requested data, in a manner that is expected by the front-end data service 118. The requested data may be contained in one or more back-end data caches 134. For example, each load-balanced back-end server may have an in-memory cache that contains the requested data, and/or there may be one or more back-end caches shared by the back-end servers.

For requests that reach the back-end data service 132 but cannot be satisfied from any back-end cache 134, the back-end data service 132 is further coupled (e.g., via an intranet and/or the internet 120) to send requests 136 for data 138 to one or more various backing data sources 140(1)-140(n). Non-limiting examples of such data sources 140(1)-140(n) may include key-value stores, relational databases, file servers, and so on that may maintain the data in virtually any suitable format. A client request for graph node data may correspond to multiple sub-requests, and these may be to backing data sources; the data service 110 is configured to make requests for data in appropriate formats as needed to the different backing data sources 140(1)-140(n). Moreover, one data store's data may override another data store's data; e.g., the data for a television show may include a generic image URL obtained from one data store, however an "editorial"-like data store may override the generic image with a different image, such as for some uncharacteristic episode. Note that in one or more implementations, non-cache data sources 140(1)-140(n) may use a wrapper that implements a common cache interface, whereby each remote data source 140(1)-140(n) may be treated like another cache from the perspective of the back-end data service 132.

Figure 2:
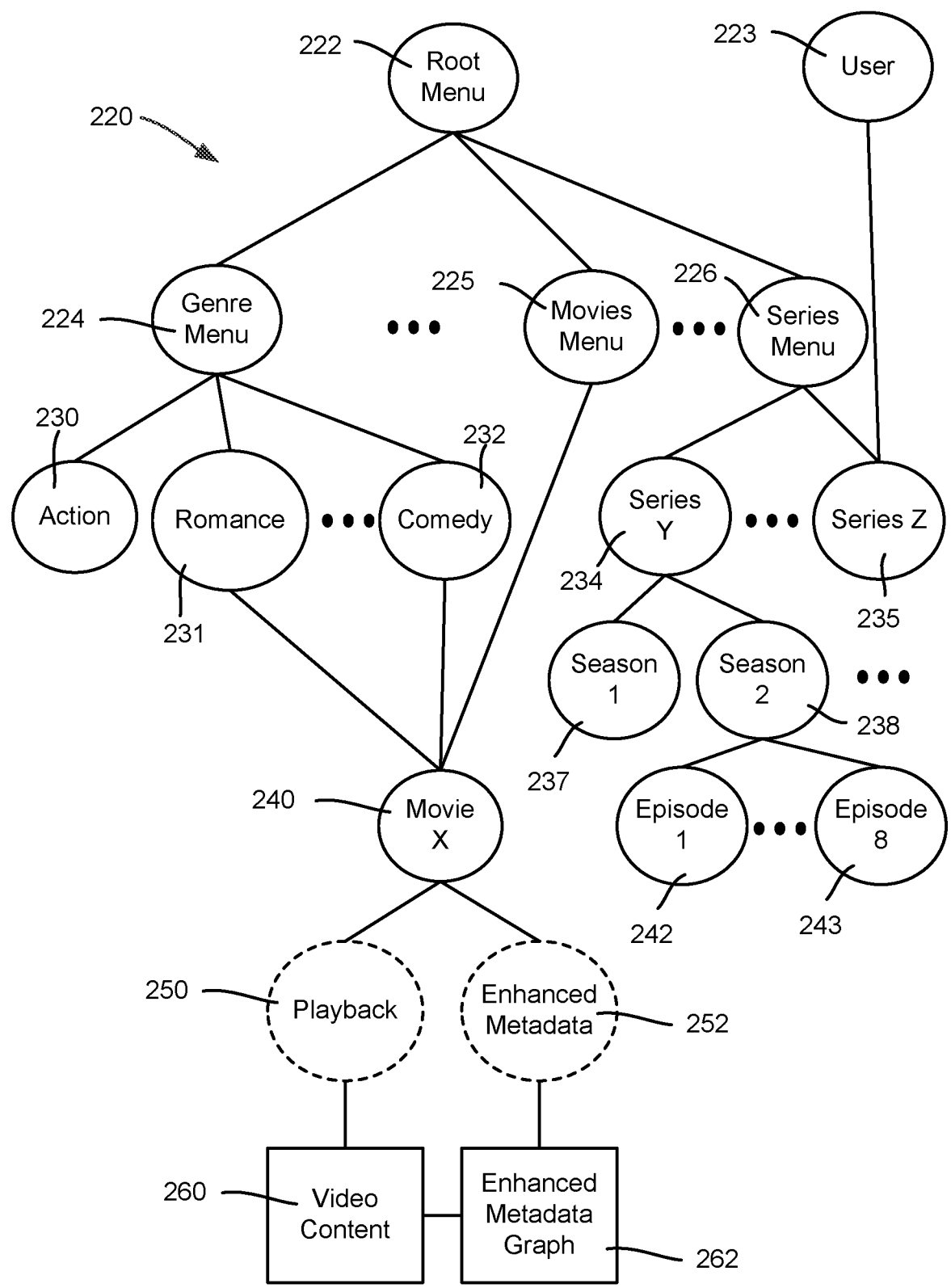
FIG. 2 is a representation of part of an example client graph of nodes including an enhanced metadata subgraph, according to one or more example implementations.

FIG. 2 shows the concept of simplified user interface graph 220 example, containing a root menu node 222 and user node 223. The root menu node 222 has some exemplified child nodes 224-226, and the user menu node is coupled (e.g., as a user-designated favorite) to a series node 235, which is also a child of the series menu 226. Each node, for example, may be visibly represented as a menu, menu item, image, text, video and so forth when rendered on a display screen.

The child nodes 224-226 in turn may have child nodes, such as the child nodes 230-232 corresponding to Action, Romance and Comedy nodes, respectively of the Genre menu 224, and the "Series" child nodes 234 and 235 of the series menu 226. As shown in FIG. 2, a typical series menu node has one or more "Season" child nodes, e.g., nodes 237 and 238, with each Season child node having "Episode" child nodes e.g., nodes 242 and 243 corresponding to that season's episodes. Note that in FIG. 2, some child nodes (e.g., those for Action genre, series Z, series Y/season 1) and so on are omitted for purposes of clearer illustration.

Eventually by traversing the graph, such as by user selection of submenus, a menu node is reached that has a node containing the information for a playable content item, (e.g., a selectable menu item, such as representing a movie that is available for playback). For example the node 240 represents some movie "X" in FIG. 2. A selectable item also may be returned in response to a search query.

In the example of FIG. 2, the node 240 is linked to a playback node 250 and an enhanced metadata node 252. Selection of the node 250 results in playback of the video content (block 260), while selection of the enhanced metadata node 252, if available, allows the user to navigate into an enhanced metadata graph 262, and navigate within that enhanced metadata graph 262. Note that as described herein, a user selection to play the video content also automatically may trigger a parallel or generally parallel downloading of at least part of the enhanced metadata graph 262.

Figure 3:
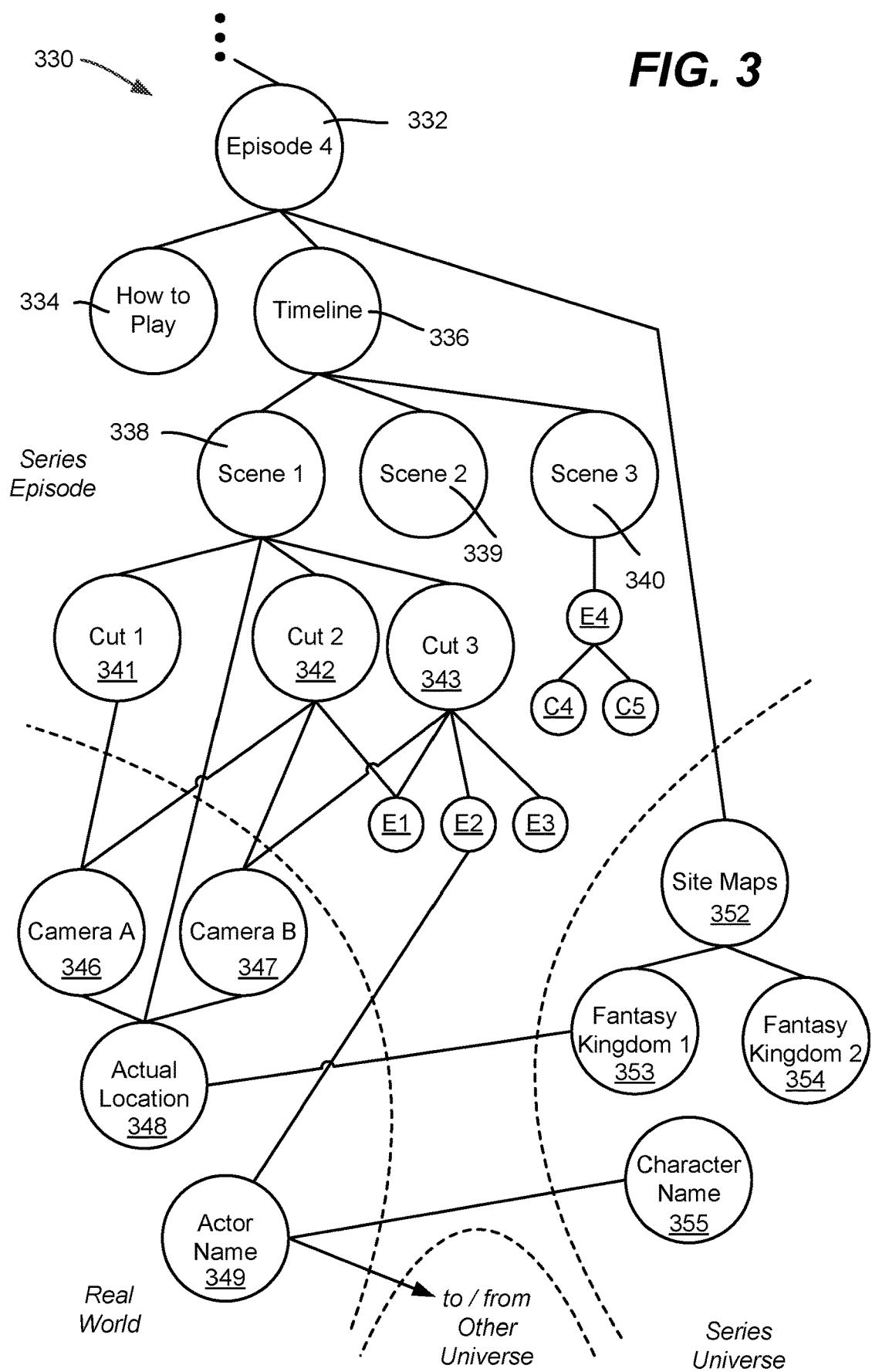
FIG. 3 is a representation of part of an example client graph including example enhanced metadata nodes, according to one or more example implementations.

FIG. 3 shows an example partial graph representation 330 for an episode, in which the episode is represented by the node 332. Information as to how to play the episode video may be present in a node 334, e.g., any information needed by the video player, such as where to resume playback for an already-started video, which may correspond to the playback node 250 in FIG. 2. Note that such information need not be maintained as a node in the graph, but is present in the node 334 in this example.

Also shown in FIG. 3 is the enhanced metadata graph, having a topmost node in this example comprising a timeline node 336, which is a parent of scene nodes (three in this example) 338-340. The timeline node, for example, may track the order of scenes, as well as possibly further information such as the cuts within each scene, and so on. For any piece of content, such as typically for a movie (and sometimes for an episode), chapter nodes or the like may be present above (or instead of) scene nodes, depending on how the writer/director/editor want to divide content's portions.

In the example graph 330 of FIG. 3 are scene nodes 338-340. Scene 1, represented by the node 338, is divided into three cuts, represented by the child nodes 341-343. Scenes 2 and 3 each may have one or more similar "cut" nodes. It should be noted that the same event node may be tied (via edge reference data) to multiple cut nodes, e.g., the cut 2 node 342 and the cut 3 node 343 are each linked to event 1 node E1; (this is another reason a graph may be more advantageous than a hierarchy). Alternatively, an event node (e.g., E4) may be a parent node to multiple cut nodes (e.g., C4 and C5), and, for example, an event node may be a direct child of a scene node (e.g., event 4 node E4 is a child of scene 3 node 340). For example, a single event such as a dialog between characters may be made up of one cut that shows one character and another cut that shows the other character, along with possibly yet another cut that shows both characters and so on. Corresponding frame data, if maintained in any node, may be sets of non-contiguous frames. To avoid too much complexity, separate, distinct nodes that actually contain the same redundant data may be used if needed.

In the example of FIG. 3, it is exemplified that cut 3 (node 343) has three distinct event nodes E1-E3. Thus, for example, if the episode tells a story that takes place in a fictional world, scene 1 may be in one kingdom, cut 3 of scene 1 may be in a palace, with events such as a character entrance (event 1), an argument between characters (event 2) and a fight (event 3) being represented by separate nodes within that cut. As can be readily appreciated, scenes and cuts are often already decided during filming, such as by a director/editor, and thus having a node representing each scene and its cut or cuts in the enhanced metadata graph are often relatively straightforward to implement. Distinct events within a cut, if any, may be decided in some other way, such as by a team of content provider employees that wants to break a cut into specific pieces, such as the different actions (entrance, argument, fight) exemplified herein. As will be understood, further dividing a cut node (or possibly a scene node) into event nodes facilitates rich, more pinpointed searches, more distinct video summaries, more accurate linking to other relevant content, and so on, when desired.

The event nodes may, for example, include specific information about the event, including what character or characters appeared, where the event took place, and what happened in the event. As described above, nouns and verbs may describe these aspects of the event.

Note that as described herein, enhanced metadata nodes are searchable, and thus some convention understood by a search engine may be needed. For example, so that a search engine traverses each possibly relevant node, any piece of content may need to be represented by at least a single chapter node with at least a single child scene node that is a parent to at least one single cut node, and so on down to a lowest-level node. Alternatively, a convention may be used in which a search engine knows to start with a topmost node and follow only child nodes as needed; thus if desired, as little as a single node may contain the information for an entire piece of content, with no node-based differentiation between chapters, scenes, cuts and events within that cut, which may be appropriate for a very short video.

Figure 4:
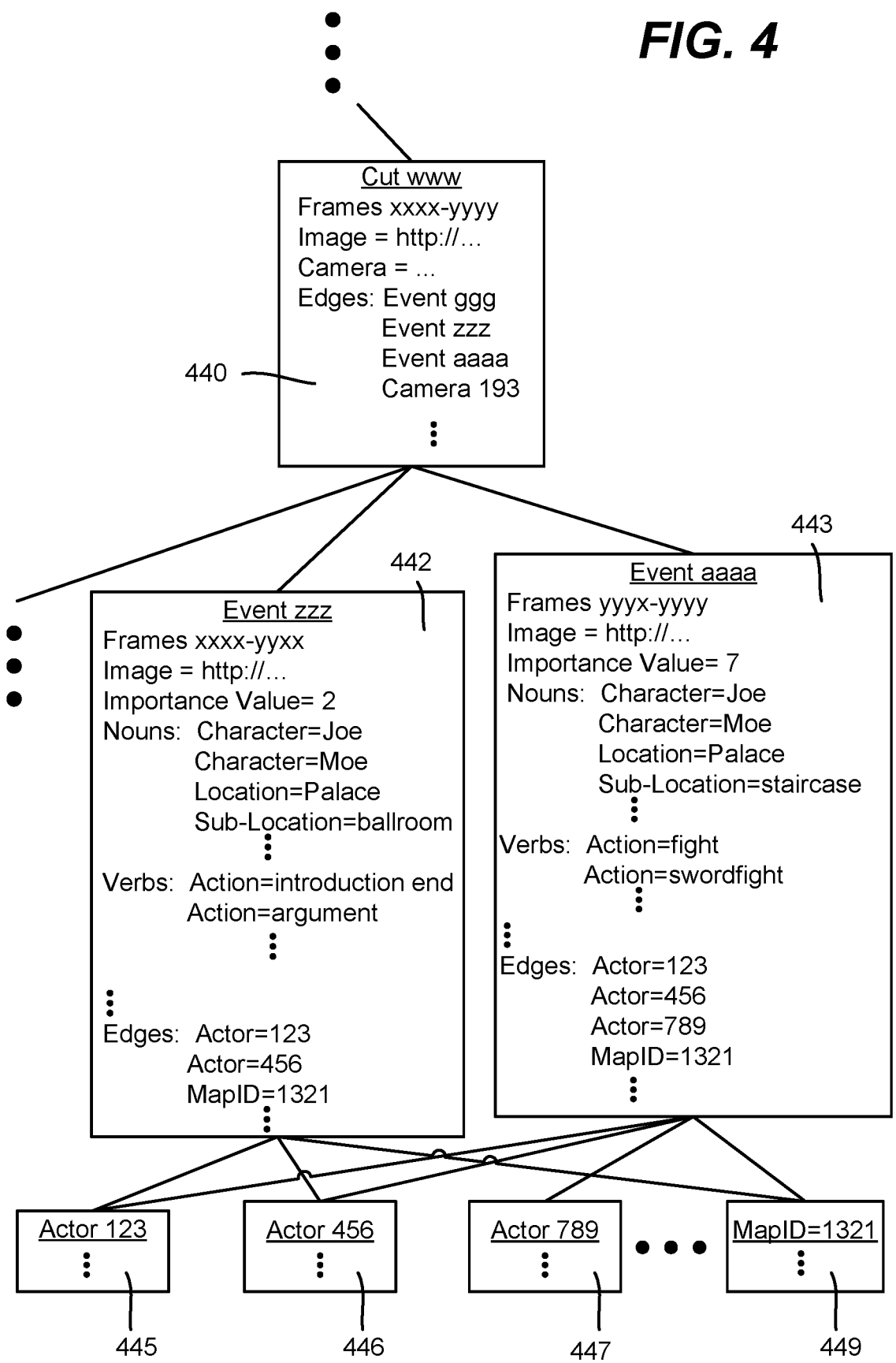
FIG. 4 is a representation of some example information that may be maintained within enhanced metadata nodes, according to one or more example implementations.

FIG. 4 shows an example of a cut node 440 including event nodes 442 and 443 as two of its children via edge data that identifies those event nodes. The event nodes 442 and 443 also are shown with edges to actor nodes 445-447 and a map node 449, along with possibly many other edges to other nodes. Note that although not explicitly shown in the simplified example of FIG. 4, edge-related data in one or more implementations may include information that specifies any specific relationship, e.g., the node 440 may include information that it is a parent to the node 442; similarly the node 442 may include information that it is a child of the node 440.

The relevant subset of nodes contain various data that are related to a currently selected video, and/or related to a connected set of content, such as a set of episodes or movies that can be searched. Thus, in the example of FIG. 4, it is seen that some cut identified in this example as www represented by node 440 has three events ggg, zzz and aaaa therein, including events zzz and aaaa having their data visibly represented in FIG. 4 by nodes 442 and 443. The nouns and verbs in the event nodes may be searched or otherwise interacted with, and/or the edges followed to obtain information from other nodes.

Note that in the simplified example of FIG. 4, the nouns are not explicitly coupled to the verbs. However, it is straightforward to do so by grouping nouns to verbs, such as including Boolean operator connection relationships, e.g., [Action=Fight OR Swordfight] AND [Character=Joe OR Character=Moe OR Location=Palace OR Sub-Location=staircase]. Some operators may be implicit rather than explicit.

As can be readily appreciated, instead of a node containing actual human-readable nouns and verbs, codes may be used; e.g., the term "fight" may be given some alpha/numerical code unique within the data service, as may each character. This facilitates tying a node's data to different language dictionaries and the like. Similarly, two characters or actors with the exact same name may be differentiated, as may two movies with the same name (original versus remake), two locations with the same name, and so on. Thus, as used herein, anything maintained in a node's information (e.g., nouns, verbs, adverbs, adjectives, certain actions, locations, actors, titles, characters and so on) may be actual text or a code or the like that maps to an appropriate dataset from where the appropriate text/graphics/audio/image data/video may be obtained.

Although not shown in FIG. 4, a brief description of a captured video event may be present in the event node; for example for the node 443:

"Joe and Moe, after being introduced in the palace ballroom and getting into an argument, get into a swordfight that descends down the palace staircase."

Instead of including the description directly, such a description may be obtained from a reference to another dataset, e.g., a URL to a data store of audio and/or text that matches the viewer's preferred language.

With such information, the enhanced metadata graph allows for a user to view significant, rich information, and also facilitates rich, more pinpointed searches. Consider that contemporary searches for content are generally limited to searching by titles, actors, genre and other very-high level information. For example, a viewer of "Game of Thrones®" (an HBO® series) may want search to find all scenes in "King's Landing" (a fictional capital city in Game of Thrones®). At present, using conventional metadata, a user may get back a set of some episode or episodes if and when "King's Landing" happens to be in an episode's title.

In contrast, with the enhanced metadata graph, a viewer may request that the search engine find content down to that described at a specific enhanced metadata node, e.g., an event node in the example of FIG. 4. With the enhanced metadata graph, a user may for example specify the scope of any set of content to search, such as an entire series, a season within that series, a particular episode or subset of episodes (e.g., all episodes in seasons one and two and so on). Once the search scope is determined, the search may be down to the any appropriate level, such as the event level, e.g., find all events in which a particular character X appeared in "King's Landing". To this end, a search may be conducted, for example, on every episode-linked node in the data service's graph including the enhanced metadata graph to determine whether or not a relevant scene, cut and/or event occurred within that episode with respect to a search query.

Using the above example, a user thus may search through the entire series of episodes, or one season (or subset of seasons) of episodes, or within a single episode, as to whether character X appeared. As described herein the viewer can further narrow such a search, e.g., to find scenes in which character X performed some action, such as participated in a fight. If populated with (or linked to) the appropriate metadata, the metadata in the enhanced metadata graph can answer such a query, along with providing information, such as for each episode ID in which character X participated in a fight, the scene number, cut number and the exact frame ranges of each such event. Another example search may be to search all movies of genre "Western" (the search scope) in which some famous actor W rode a horse (the actor and action that match the requested criteria within the search scope).

Turning to another aspect, in addition to user-specified search criteria, highlights/a summary of an episode (or multiple episodes) may be put together for viewers by automatically finding and generating/compiling relevant video content based upon the information in the enhanced metadata graph. The summary may be assembled by automatically searching the enhanced metadata graph node's to select content according to each user's selections, stated preferences, other viewers' feedback, the content provider team's preferences (e.g., by flagging events they deem significant) and so on. For example, an event node's data may contain a "summary" yes or no flag, whereby an episode summary may be assembled via the events containing the flag set to yes, e.g.: [scene 1, cut 2, event 3; scene 2, event 8, cuts 3 and 4; . . . ].

Instead of a flag, some "deemed" summary/highlight importance value (e.g., ranging from one to ten) may be included within the metadata of each event node (or other node), so that users can get a subset of events above a certain user-specified threshold value; (instead of maintaining the flag or importance value within a node, such data may be otherwise associated with a node, e.g., via a separate database). A node-contained importance value is exemplified in FIG. 4 via the event 442's data containing an importance value=2, and the event 443's data containing an importance value=7. To reiterate, such a value may be determined in any way or combined number of ways, e.g., set by the content provider (author, director, editorial team, etc.), set by user preference data ("highlight fights and battles"), gleaned user history (the user often rewinds fight events), other user actions (many users have requested replay of this event, possibly those with similar demographics to the current viewer), and so on. State data such as time of day, day of week, demographics of viewer, ratings, current news events, social media content and so on also may be used instead of or in addition to other ways to determine such an importance value for any node or the like. There may be more than one such value, e.g., a user-based highlight importance value, a data service-assigned summary importance value, and so on.

With respect to generating a summary, for example, once the value set is determined for the relevant set of events to summarize, another way to use such a summary value is to automatically provide the summary based upon how much time a user wants to spend viewing it. For example, a user may request a very fast (approximately two-minute) summary of the most important events, and the data service can compute an importance threshold that approximately meets the desired time, e.g., only those with summary values nine and ten; if the user requested five minutes, only those with summary values above seven and so on, possibly with some random or time-based selections for those valued at six, such as to better approximate the requested time. Alternatively, independent of actual time, some other selection criteria such as major, medium and minor summaries may be assembled based upon importance values; e.g., the major summary has selected those events with values eight to ten, the medium summary has selected events with values five to ten, the minor summary has events valued from three to ten. Any other way to use such values or flags to make an inclusion decision may be used.

Note that automatic selection of a summary/highlight video may follow any rules it wants, possibly as constrained by viewer input, in selecting and ordering events, and for example need not follow the original timeline of the content. For example, the important scenes of one character (or site) can be part A of a summary, followed by the important scenes of another character (or site) as part B, even though in the actual episode some of the scenes, cuts or events of part B of the summary preceded some of those of part A.

Figure 5:
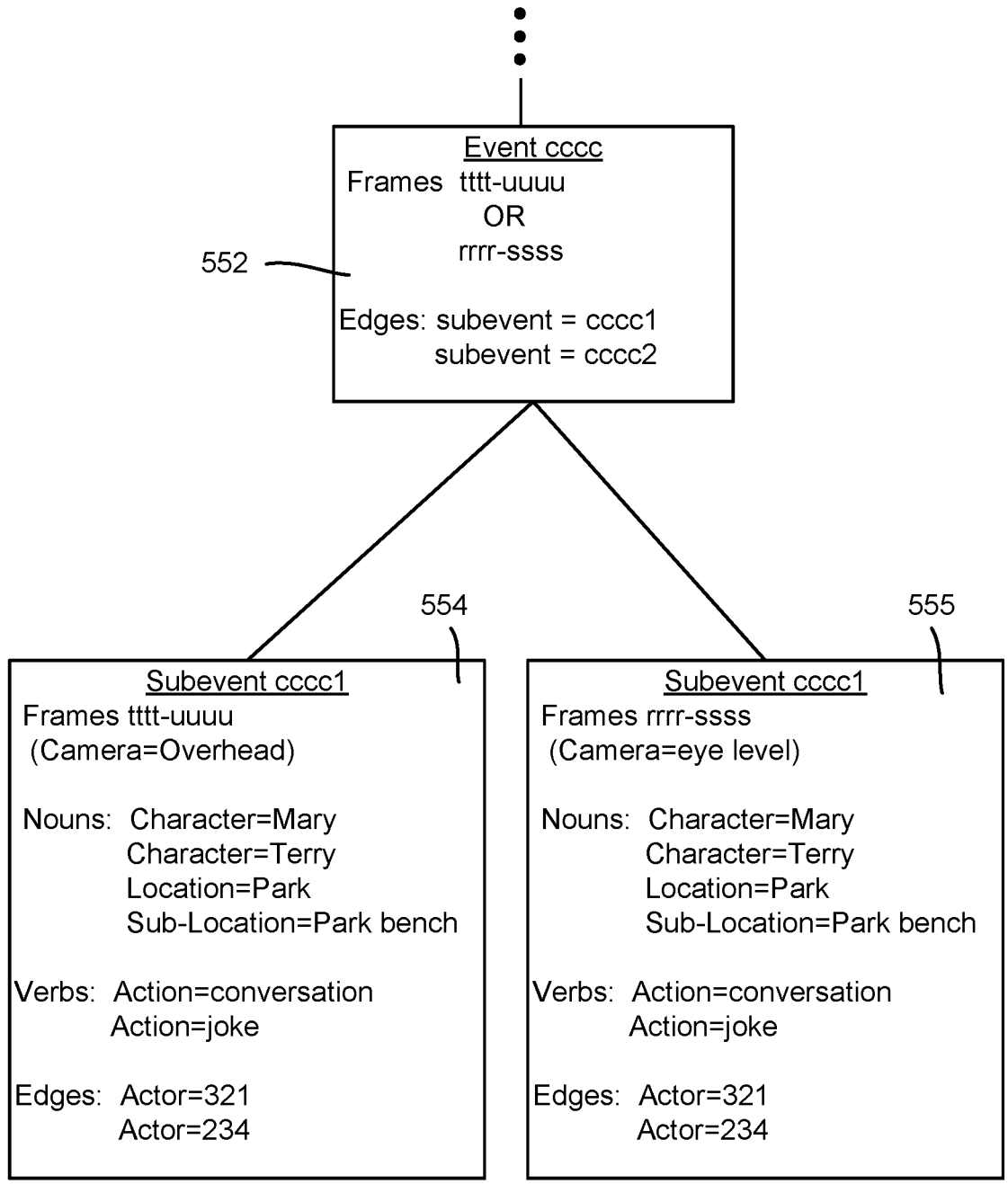
FIG. 5 is a representation of some example information that may be maintained within enhanced metadata event and subevent nodes, according to one or more example implementations.

Turning to another aspect, FIG. 5 is a representation of how an event 552 may be separated into multiple subevents; two subevents are shown, labeled 554 and 555. In the example of FIG. 5, consider that the same event was filmed with two different cameras, e.g., one overhead and one eye-level relative to the characters. Thus, two (or more) different sets of video frames exist for this event, each represented by a subevent node 554 or 555. User preference or some other selection data (e.g., state data such as time of day, the opposite camera angle of the one last shown and the like) may be used to choose between them and/or override the director's default choice.

In a similar way, instead of offering the same content from different camera angles, subevents may provide for completely different content to be shown for a given event. For example, one viewer may get a happy ending to a movie, another viewer a sad ending, and yet another viewer an unresolved ending. Each of such three endings may have their relevant frames identified in different subevent nodes in the enhanced metadata graph. User age relative to scene/cut/event rating may be used to choose between different content.

In this example, to choose among subevents, when reaching a point where actual video data needs to inserted into or taken from a buffer for playback, the enhanced metadata graph may be consulted by the data service to choose which actual video data (e.g., frames) to use. This decision may be at the client side after downloading the alternate video streams, or may be at the server side, by selecting one stream or another before sending. The concept of alternate content selection including via one or more buffers is described in U.S. patent application Ser. No. 15/135,783 entitled "STREAMING MEDIA STATE MACHINE," assigned to the assignee of the present application and hereby incorporated by reference in its entirety.

As can be readily appreciated, the depicted subevents 554 and 555 in FIG. 5 contain redundant information, as do some of the event nodes 442 and 443 in FIG. 4. Such redundant information, if consistent in a parent node's child nodes, may be replaced with a single instance of that information in the parent node, with child nodes effectively inheriting the parent node's information for purposes of searching and differentiating from other nodes. Although this may complicate traversing the graph (e.g., for searching) in that the search mechanism or the like has to possibly traverse different levels of nodes to find possibly commonly-inherited data, in certain instances this may significantly reduce the overall amount of data in a graph or partial graph.

Turning to another aspect, the enhanced metadata graph is not limited to the corresponding metadata of a particular series, season or episode (or movie, or movie chapter, etc.). As generally represented in FIG. 3 (and via the edge data in FIG. 4), any node of an enhanced metadata graph (as well as the regular client graph) can be linked as desired by the data service to any other node obtainable from the data service. This allows for tying together concepts such as real world entities including actors, actual filming locations (a fictional kingdom may be linked via the enhanced metadata graph to the actual location in Europe where it was filmed), actual cameras and so forth with fictional entities such as characters, fictional sites, fictional maps, viewpoints (overhead versus forward facing camera angles) and so forth. Thus, for example, viewer selection corresponding to interaction with the data of any appropriate node can link to an actor's real or stage name, link from the actor's character in one series to the same actor's character in another universe (e.g., series or movie) and so on. When such edges are present, a user can, via the graph, view information regarding the actual location (e.g., maps, photographs and so on) that a scene, cut and/or event was filmed; the user may then return to the original video, or choose to navigate among more enhanced metadata, start a new video (a summary of the original video, an entirely different video, a summary of an entirely different video), and so on.

Still further, the enhanced metadata graph allows crossovers between fictional universes. For example, movies based on comic book characters sometimes contain one or more cameo or "guest star" appearances by characters of another fictional universe. Edges between nodes may model such crossover appearances. Similarly, television shows such as medical, police and fire dramas sometimes have characters cross over into each other's episodes, e.g., an injured policeman character known from a police drama guest stars as that same character in a medical drama. By simply providing appropriate edges connecting nodes in the metadata, the enhanced metadata graph is able to provide a user with a straightforward way to navigate among a significant amount of desired information in each such fictional universe as well as information in the real world. Note that users can obtain information for content (and possibly view content) that is edited out of the publicly-released version, if the data service makes such information/content available via links to the enhanced metadata graph. It is also feasible via a user tool or the like for a user to customize some nodes when in the client's graph to include custom data, including edge(s) to other node(s).

To summarize, a user may interact with the enhanced metadata graph in a number of ways. One way described herein is to interact via a summary/highlight video based upon criteria-selected nodes. Another way is by searching, e.g., via a freeform text search or with assistance (e.g., from dropdown menus of valid search terms and the like). The scope/starting point of the search may be chosen by the user, e.g., from the topmost (e.g., root or user) menu to any level below the root menu in the graph.

Figure 6:
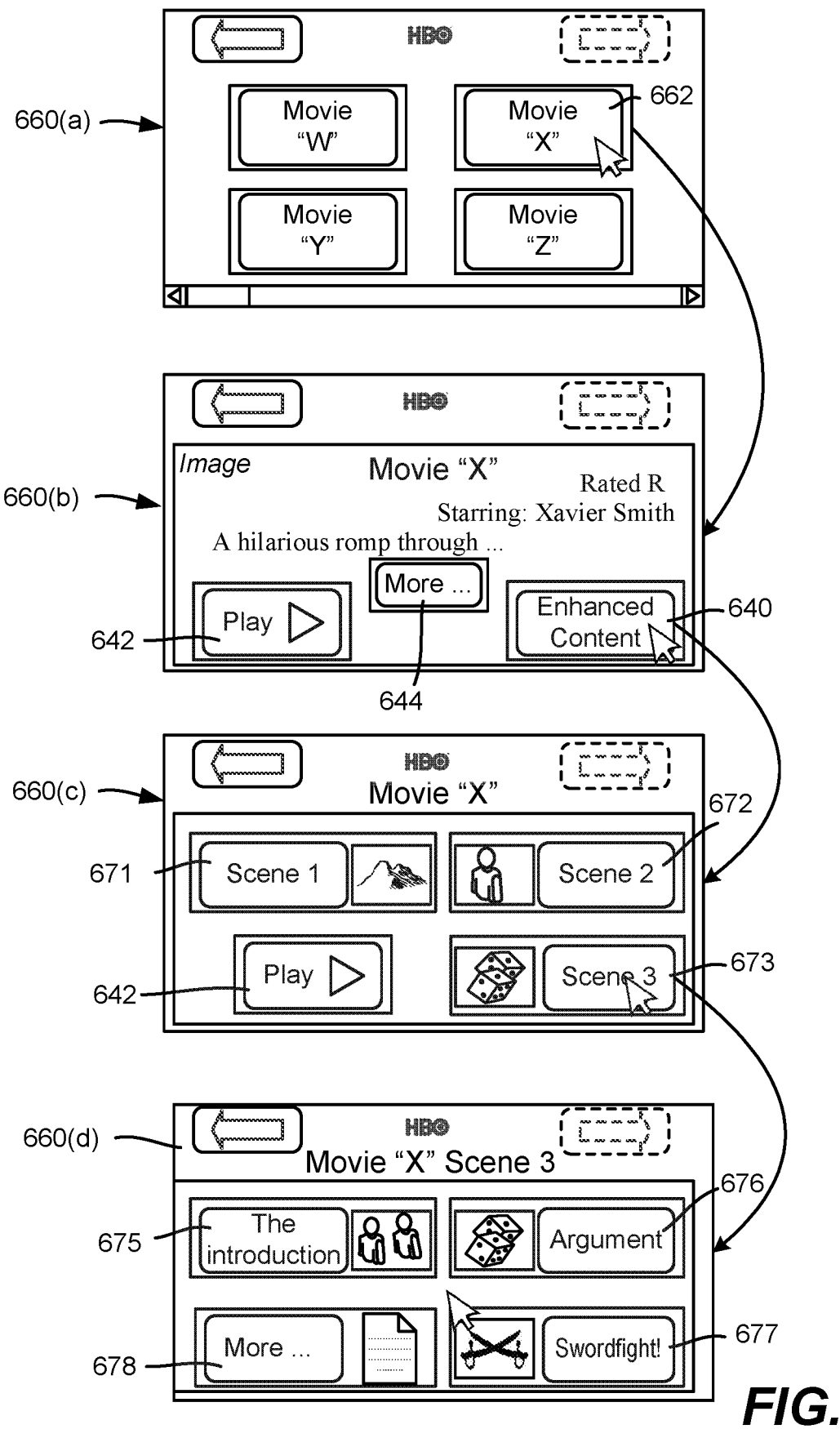
FIG. 6 is an example of a user interface with which a user may interact to submit requests based upon a graph to obtain more interactive data for selection, including enhanced metadata, according to one or more example implementations.

Still another possible type of user interaction is with rendered visible representations of (at least some) of the metadata graph nodes/data therein. FIG. 6 shows a hypothetical user interface of various menu objects 660(*a*)-660(*d*) that for example may be based upon some data that is part of an example enhanced metadata graph containing scene nodes with some child event (and/or possibly child cut) nodes. In FIG. 6, a movie selection menu 630(*a*) (e.g., reached by navigating from a root menu to a genre menu to a particular genre selection) provides a number of interactive buttons, which may be interactive tiles (possibly including information beyond text) that link to movies or other information. In this simplified example, from the movie selection menu 660(*a*), the user interacts with a tile or button 662 to select a movie titled "X", which navigates to a menu 660(*b*) from which the user may make selections regarding that movie. The options include a "Play" option (button 664), a "More . . . " option (button 666, e.g., by which a user may read/view more about the movie), and an "Enhanced Content" option (button 668), which in this example provides the user with access to information in an enhanced metadata graph node set corresponding to the movie. A back arrow button is also shown for navigating back to the prior menu or other screen (such as a search entry page).

From the menu 660(*b*), in this example the user selects the "Enhanced Content" option (button 668), which changes to show a menu 660(*c*) of scenes represented by buttons 671-673, each button displaying a representative image as part thereof. For purposes of brevity, only three scenes are available in this particular example, and Scene 3 has three events or cuts; (there are no chapters, for example).

The user in this example selects Scene 3 (button 673), providing a menu 660(*d*) by which the user can select even more specific content, e.g., corresponding to events (or cuts) in Scene 3 represented by the buttons 675-677, each with an accompanying text description and representative image. Selecting one of the buttons 675-677 may, for example, provide a detailed textual and/or audio description of the scene, one or more further images, a "Play Portion" button to play just that event's frames or some subset thereof, and so on. A "More . . . " button 678 allows further interaction with related metadata, such as by linking by one or more further menus to actor data of the actors in the scenes, a map, character data, and so on.

FIG. 6 is only one simplified, hypothetical way in which a user may more directly navigate through the enhanced content metadata node set with respect to a selected piece of video content, as well as to navigate to other metadata nodes by following links (node edges) beyond those directly associated with the selected video content. Another way is by searching, including as described herein, e.g., by selecting the scope of the search (e.g., Series A, season 1) and finding events that match search terms within that scope, or having a search generate a summary.

Yet another way to interact with enhanced content metadata information is by interacting while the video playback is occurring or is paused/stopped at a certain point. Enhanced content at this point may be displayed in any number of known ways, e.g., shrinking of the main video and using the now-available screen real estate for displaying metadata, overlaying metadata in the form of text and/or graphics (e.g., with some opacity), replacing the main video with a full screen of enhanced content metadata and so on, to allow interaction with displayed data while a video is paused/stopped or continues playing in conjunction with displayed metadata.

When choosing to interact during playback, a typical user initially wants to see at least some metadata related to the current playback position, such as a floorplan of the palace being shown when the user paused, a map of the city, and so on. A typical user also does not want to wait a long time to begin interacting.

However, because client device storage and bandwidth is limited, the entire enhanced metadata graph associated with a full video is typically not cached on the client device. Instead, analogous to a video buffer, portions of the enhanced metadata graph that are currently relevant to the streaming video's position may be downloaded to the client cache, such as in a parallel or substantially parallel hidden stream.

Figure 7:
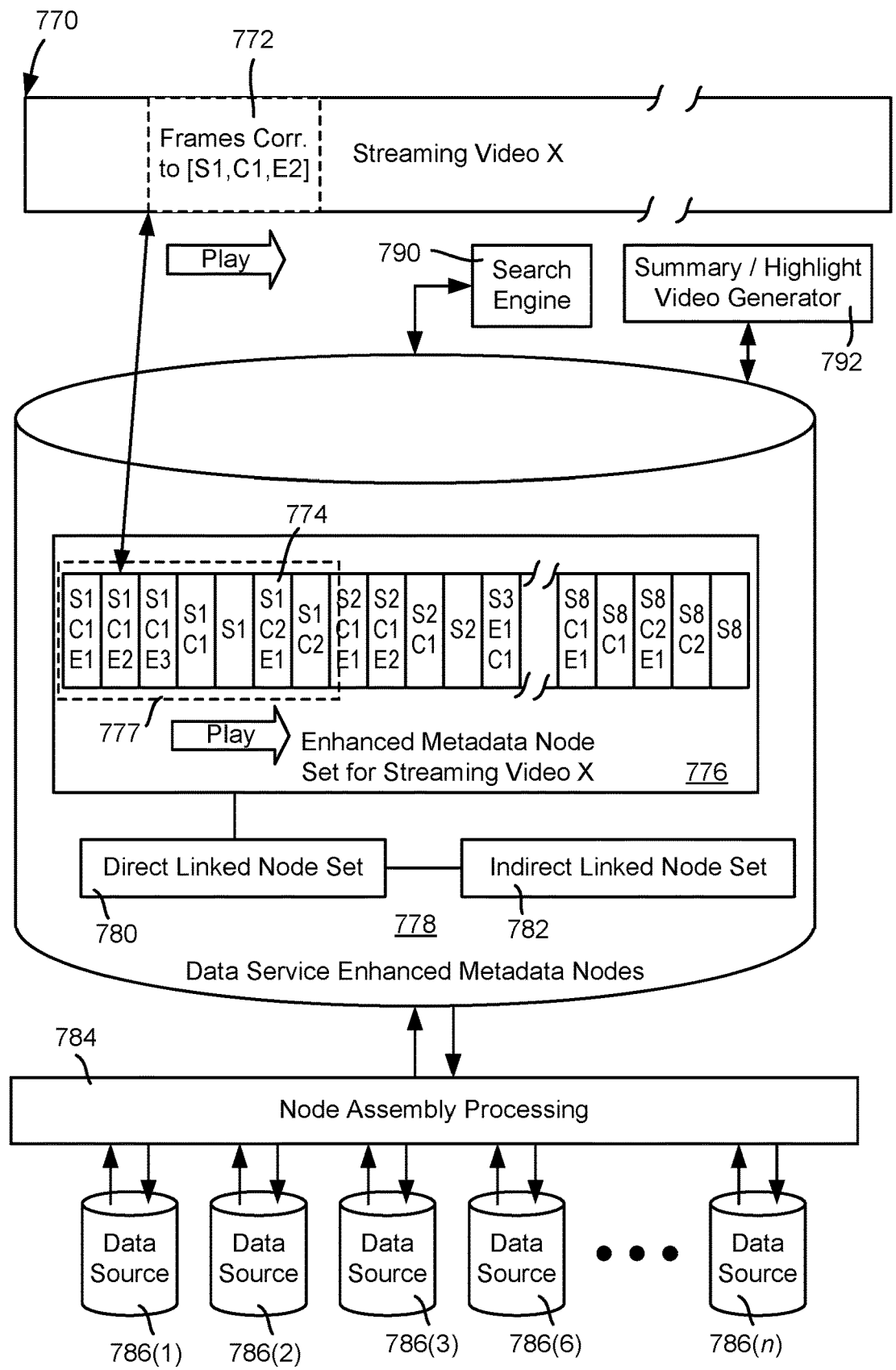
FIG. 7 is an example of how one or more portions of streaming video may have corresponding descriptive enhanced metadata associated therewith, according to one or more example implementations.

FIG. 7 shows a streaming video 770 with each of its portions (e.g., such as the set of frames 772) corresponding to a subset 774 of an enhanced metadata node set 776 for that streaming video. In the example of FIG. 7, a sliding "window" 777 of some enhanced metadata nodes may be downloaded to the client device for caching, so that the client cache includes enhanced metadata that generally correspond to the video data currently in the client device video buffer, as well as possibly some very recently-played video portion. In this example, the entire first scene, S1, may have its enhanced metadata nodes grouped together in the window 777, as a unit for caching/cache eviction (regardless of how many data packets are needed to stream them). Note that if unable to group together as a unit, the order of sending the enhanced metadata nodes may be useful so that caching a useful subgraph occurs first, while eviction of the older enhanced metadata nodes is less likely to evict something still needed. Thus, for example, in scene 1 the lowest level nodes, event nodes E1, E2 and E3 of the first cut are sent before scene's 1 cut 1 node, and before the scene 1 node, followed by cut 2's event 1 node and the cut 2 node. In this example, the information in the three event nodes, cut 1 node and scene 1 node is available for interaction after the first five enhanced metadata nodes are streamed; if an enhanced metadata node needs to be evicted as new nodes come in as video events complete, the oldest node is the event 1 node and so on, which is most likely no longer needed.

Note that like any resource-constrained entity, the data service itself may not maintain a full set of enhanced metadata nodes for a video at any one time, (and some offered content like an obscure movie may not have enhanced metadata at all, or only a limited amount). Thus, among the enhanced metadata nodes 778 that the data service maintains, the data service may (or may not) maintain the entire node set 776 for a video, as well as some directly linked nodes 780 and indirectly linked nodes 782. Instead, the data service may assemble (block 784) enhanced metadata nodes on demand as needed or in anticipation of their need, such as from data maintained at various data sources 786(1)-786(n). These data sources 786(1)-786(n) often do not maintain the data in node form, and any node may need to have its data obtained from different data sources. Thus, the data service may process various data into enhanced metadata node(s) as needed or in anticipation of its being needed soon.

Also shown in FIG. 7 is a search engine 790 that is configured to receive client search requests (e.g., search scope and one or more search criteria) and return information found in the metadata nodes, e.g., what video portions (e.g., frames) of which videos match the search request. Further shown in FIG. 7 is a summary/highlight video generator 792 that uses the metadata nodes to generate a video based upon some scope and/or selection criteria.

Figure 8:
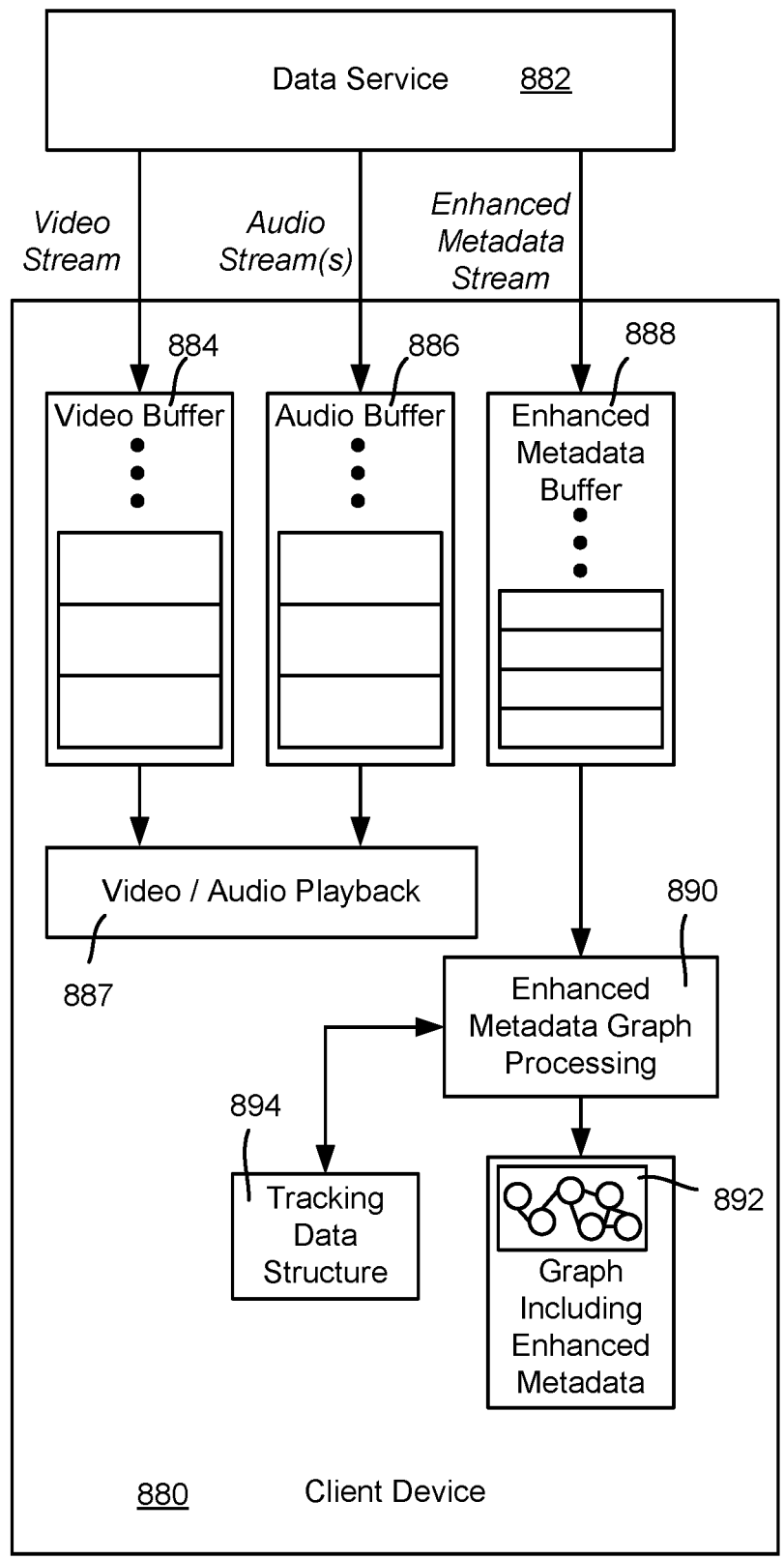
FIG. 8 is an example representation of how enhanced metadata may be streamed to a client device in association with video (and audio) data, according to one or more example implementations.

With respect to the client buffers and caching, in the example implementation of FIG. 8, a client device 880 receives multiple streams from a data service 882, e.g., via a content distribution network. Thus, to correspond a subset of the enhanced metadata with the video being played on a client device, the data service downloads currently relevant enhanced metadata nodes to a cache of the client device, e.g., in a separate metadata stream. This is typically done in parallel or substantially in parallel with the video stream, like an audio stream, although possibly to a different port(s). It is also feasible to have a combined stream to the same port with different data interleaved, e.g., sorted based upon header data to an appropriate buffer.

As is typical, the client buffers video data in a video buffer 884, and audio data in an audio buffer 886 (different buffering for left and right channels, forward and rear, subwoofer, etc., and/or secondary audio may be present in some scenarios but are not shown in FIG. 8). Video/audio playback components (block 887), which may be separate, may operate in a generally conventional manner to produce audio/video output.

The enhanced metadata stream is shown as being sent to an enhanced metadata buffer 888 where it is processed via enhanced metadata graph processing 890 into the client graph 892. Note that the illustrated size of the buffers 884, 886 and 888 and the blocks (e.g., packet data) therein are not intended to represent actual relative sizes. As described below with respect to FIG. 10, the enhanced metadata graph processing component 890 may maintain a tracking data structure 894, such as a FIFO queue of node identifiers, so that enhanced metadata nodes may be managed in the cache via a different policy from other cached data.

As can be readily appreciated, in order to generally correspond to the video currently being played, as the video plays, the client device is generally configured to replace less currently relevant enhanced metadata with more currently relevant enhanced metadata. Cache size considerations may be used as part of the eviction/replacement criteria with respect to "past" enhanced metadata nodes, and also with respect to buffering some amount of "future" enhanced metadata nodes. Further, certain enhanced metadata nodes as well as more conventional graph nodes may be cached independently (at least to some extent) of the video stream's current position, such as graph nodes deemed more significant and thus more likely to be used by an interactive user at any given moment.

In this way, conventional video playback may be performed, with the enhanced metadata in the cache generally synchronized with the video. Device type information corresponding to buffer size, cache size and the like as well as the type of video compression being used may be communicated to/generally known by the data service for different devices/classes of devices and used to determine how often to send an enhanced metadata packet relative to the video packets and audio packets so that they are generally synchronized. If the video playback is paused or stopped, the enhanced metadata stream/download may be modified (e.g., increased) to the extent there is room in the cache, such as to provide for anticipated forward or rewind operations, and/or to anticipate the user wanting to interact with the enhanced metadata. As can be readily appreciated, FIG. 8 is only one example, and any of numerous other ways to download separate information while keeping the information in synchronization alternatively may be used.

It is also feasible to download two (or more) separate streams of enhanced metadata, such as a higher priority stream and a lower priority stream. For example, to save bandwidth, if two enhanced metadata streams are used, a higher priority stream of enhanced metadata packets may be downloaded first to some limit, before a lower priority stream is downloaded. A similar mechanism is to interleave higher priority stream packets with a different interleaving ratio relative to a lower priority stream's packets, e.g., three higher priority stream packets to each one lower priority stream packet.

Figure 9:
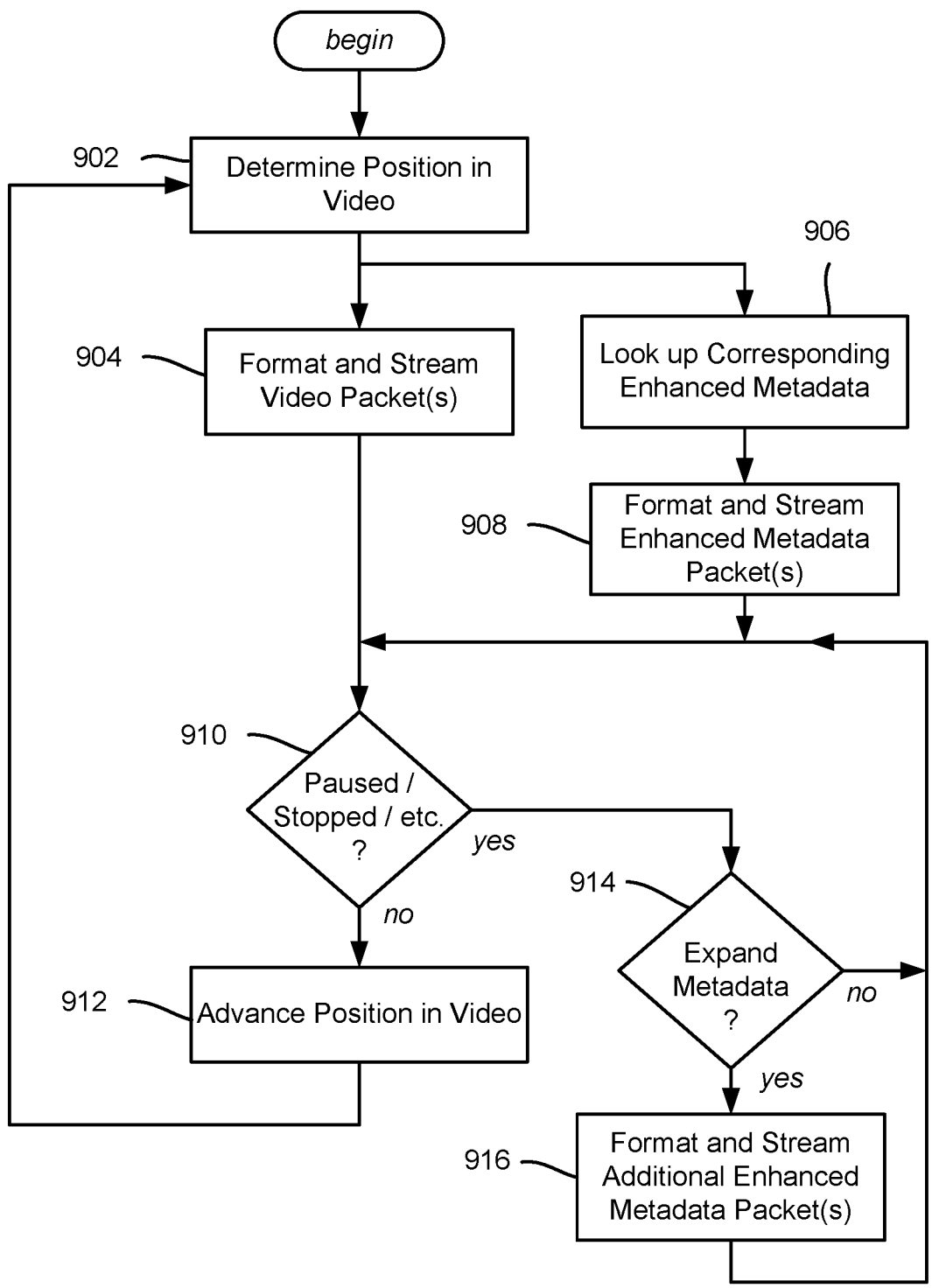
FIG. 9 is a flow diagram showing example logic/steps that may be taken by a data service to stream video and accompanying enhanced metadata, according to one or more example implementations.

FIG. 9 is a flow diagram showing example steps that may be taken by a data service to stream enhanced metadata to a client device in conjunction with streaming video data (audio is not separately described). Step 902 represents determining the position in the streamed video being played, with step 904 formatting and streaming the appropriate video packets; steps 902 and 904 may be conventionally performed operations to stream video into the client video buffer.

Steps 906 and 908, which may be performed in parallel or substantially in parallel with step 904, use the position in the video to determine what subset of enhanced metadata corresponding to the video to stream. Step 908 represents formatting and streaming the appropriate enhanced metadata packet(s) corresponding to the video packet(s) being streamed at step 904.

Typically unless the video buffer fills or the user performs some action to stop playback, the video position advances and the video and associated metadata continue to stream as represented by steps 910 and 912. Example user actions that may halt playback include pausing the video, stopping the video, fast forwarding or rewinding the video, and so on; (reaching the end of the video may be considered stopping the video at step 910). Ending the video in some other way (e.g., device rebooting, network disconnection) and so on are not described herein.

At such an event or state detected at step 910, step 914 may be optionally performed to expand the amount of metadata in the client cache at step 916, e.g., until some cache size limit or metadata expansion limit is reached. As described above, this expanding of the metadata may be in anticipation of the user wanting to interact with the metadata at this time, whereby pre-caching additional enhanced metadata may improve the client user's enhanced metadata interaction experience.

Figure 10:
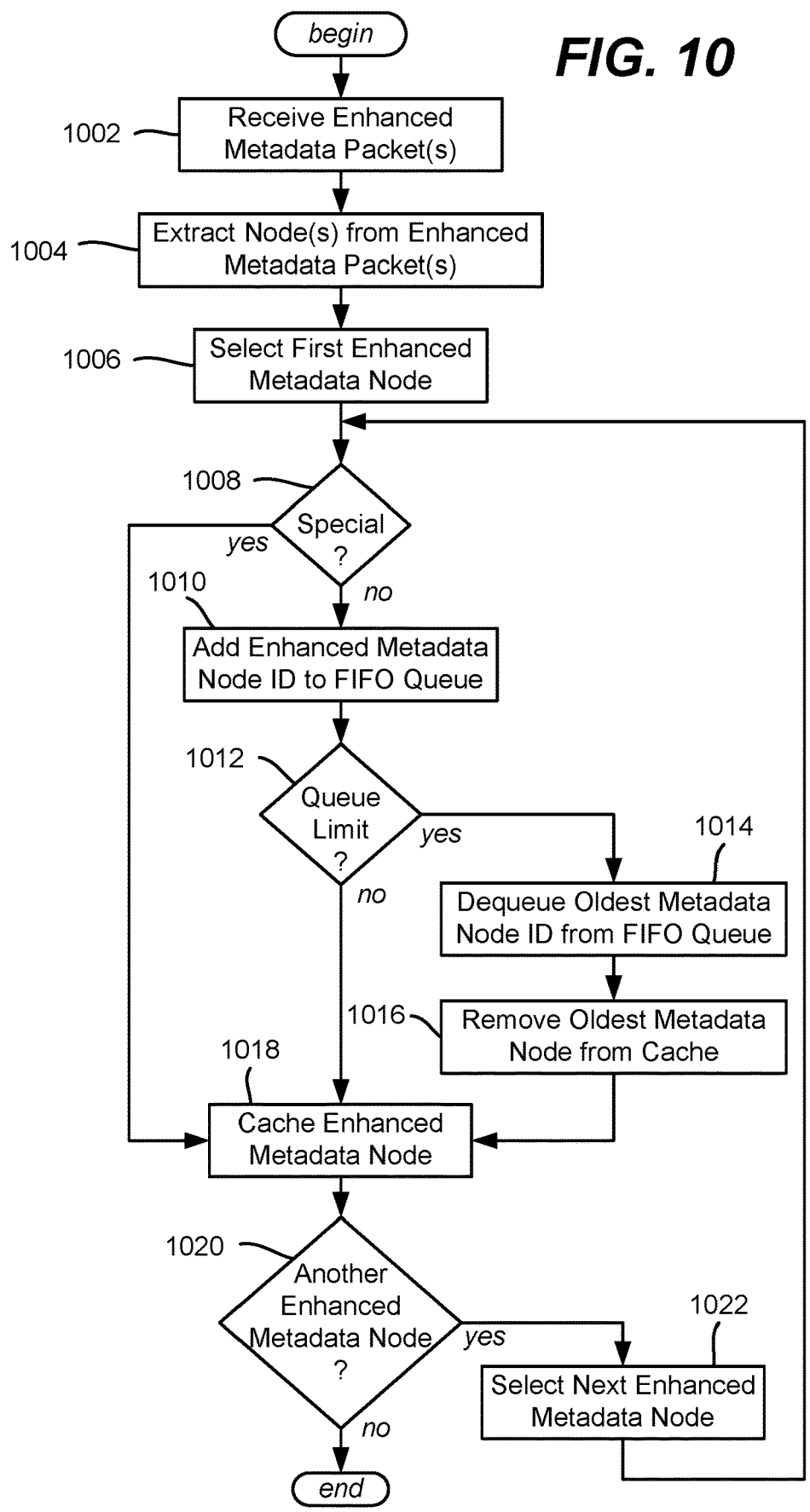
FIG. 10 is a flow diagram showing example logic/steps that may be taken by a client device platform or other software to cache enhanced metadata, according to one or more example implementations.

FIG. 10 is a flow diagram showing example steps that may be taken by a client device (e.g., the enhanced metadata graph processing component 886 of FIG. 8) to manage the client cache with respect to enhanced metadata. The example logic of FIG. 10 is only one of many possible ways to manage enhanced metadata with respect to caching; the logic works with a single client cache that maintains both conventional user interface nodes (e.g., menus, sub-menus, items) and enhanced metadata nodes (e.g., for scenes, cuts, events and/or the like as described herein). This allows a single (partial) graph containing conventional user interface nodes and enhanced metadata nodes to be cached, as the enhanced metadata nodes link to one or more of the conventional user interface nodes (e.g., via episode, timeline nodes or movie, timeline nodes).

Step 1002 represents the client device receiving one or more enhanced metadata packets on the enhanced metadata stream buffer. Step 1004 extracts the enhanced metadata node or nodes from the packets. Step 1006 selects the first enhanced metadata node. Note that each node has an identifier (ID) that is unique within the data service.

Step 1008 is an optional step that evaluates whether the node is a special node that arrived on the enhanced metadata stream, e.g., as marked in the node's header or data by a flag or the like. Via step 1008, such a node is cached (at step 1018) if it is deemed by the service to be significant in some way, such as independent of the video portion it accompanies, or likely to be needed soon by the client user. This allows the enhanced metadata stream to get graph nodes cached in the client cache that are evicted/expired according to a regular cache policy, as opposed to the policy for evicting/expiring enhanced metadata nodes that are associated with the currently buffered or playing portion of the video as described herein.

If not a special node, step 1010 adds the ID of the enhanced metadata node to a FIFO queue or other suitable data structure. Step 1012 evaluates whether the queue is at its limit.

If not at the queue limit, the enhanced metadata node is cached. Conversely, if at the queue limit, then an enhanced metadata node identifier (e.g., the oldest if a FIFO queue) is removed from the queue at step 1014, and that corresponding (e.g., oldest) node is removed from the cache at step 1016. Note that the node need not actually be removed from the cache at this time, but can be marked for eviction, be given an expired timestamp and so on whereby a cleanup process or newer node can replace it as cache space is needed. Step 1018 caches the enhanced metadata node, possibly overwriting the removed node's space if needed.

Sep 1020 repeats the process for each other enhanced metadata node that was received. When none remain, the process ends until more enhanced metadata nodes are streamed into the enhanced metadata node buffer.

As can be readily appreciated, the example steps of FIG. 10 allow the client device platform software to determine its own limits with respect to how much enhanced metadata to generally maintain. In this way, devices with fewer resources can have a smaller queue/less enhanced metadata in the cache, while devices with more resources can have a larger queue/more enhanced metadata in the cache. Bandwidth also may be a consideration, e.g., only when the video buffering is keeping up is enhanced metadata allowed. Similarly, data plan may be a consideration, possibly determined via user input if limited; e.g., do not download metadata unless specifically wanted if doing so will cause the user to incur a cost.

As described above, instead of processing enhanced metadata nodes individually for caching and removal as in FIG. 10, groups of enhanced metadata nodes may be processed together. For example, a subgraph comprising an entire scene's enhanced metadata nodes may be treated as a unit with respect to being evicted from the cache together (and possibly as a group when adding to the cache). Data such as which nodes are grouped together may be streamed along with the enhanced metadata nodes as a special informational "meta node" or the like, e.g., not cached as a node but saved as part of the tracking data structure 894 (FIG. 8) until a group is evicted.

As can be seen, described herein is a technology that streams or otherwise downloads metadata related to a streamed video, allowing a user to selectively interact with the metadata for an enhanced user experience. A user may navigate among any of the links or pivot directly on the graph nodes to view data such as maps, different cuts of the same scene, different camera views of the same cut, event descriptions (text and cast/crew interviews), actor and character information such as biographic text and interviews, a summary of what scenes this actor (or character) appeared in, and so on.

The graph allows relationships between different environments, such as the real world (cameras, actual locations and actors) and alternate universes, such as fictional worlds and characters. Fictional worlds can be related to one another. Viewers can see events by following links, even if the event is cut from the final version. The graph allows for rich searches. Summary or highlights of a movie(s) and/or episode(s) may be put together for viewers by automatically generating relevant content based upon one or more selection criteria.

One or more aspects are directed towards relating portions of a video with subsets of enhanced metadata, each subset of the enhanced metadata describing at least one action in a corresponding portion of the video. Upon streaming the video to a client device, described herein is determining which portion of the video is being streamed, selecting a selected subset of the enhanced metadata that corresponds to the portion of the video being streamed, and downloading the selected subset of the enhanced metadata to the client device.

Downloading the selected subset of the enhanced metadata to the client device may include streaming the subset of the enhanced metadata in a stream in parallel or substantially in parallel with a streaming video stream.

The enhanced metadata may be configurable as nodes of a graph; determining which portion of the video is being streamed may include determining a set of frames, and selecting a selected subset of the enhanced metadata that corresponds to the portion of the video being streamed may include selecting at least one enhanced metadata node based upon the set of frames. Selecting the selected subset of the enhanced metadata may include selecting at least one enhanced metadata node that includes information describing an action in the corresponding portion of the video. Selecting the selected subset of the enhanced metadata may include selecting at least one enhanced metadata node that includes information describing a character or a location, or both a character and a location, in the corresponding portion of the video.

The described technology allows for receiving a request to search for information within the enhanced metadata, determining a search scope based upon the request, determining one or more in-scope subsets of the enhanced metadata to search based upon the search scope, searching the one or more in-scope subsets for matching information based upon one or more search criteria in the request, and returning a response to the request that identifies any matching information determined by the searching.

The described technology allows for receiving a request to generate a summary or highlight video, locating one or more relevant subsets of the enhanced metadata corresponding to the summary or highlight video, and using information in the one or more relevant subsets to generate the summary or highlight video.

Further, before streaming the video to the client device, at least one subset of the enhanced metadata may be downloaded to the client device based upon user interaction, such as to provide for rendering a visible representation of at least part of the subset of the enhanced metadata on the client device, and to allow user interaction with the visible representation.

One or more aspects are directed towards a data service of a video content provider, in which the data service is configured to stream video to clients. The data service is further configured to send information corresponding to enhanced metadata nodes to the clients, including to select a subset of the enhanced metadata nodes that is relevant to a portion of a video, and to send the subset in association with the portion of the video being streamed to a client.

The enhanced metadata nodes may include at least one of a chapter node, a scene node, a cut node and/or an event node. The subset of the enhanced metadata nodes that is relevant to the portion of the video may describe the portion of the video with information corresponding to at least one verb and one noun. The enhanced metadata nodes may include at least two or more alternate nodes that are both relevant to a same portion of the video.

The data service may be configured to search at least some of the enhanced metadata nodes to identify one or more video portions that match search criteria or a search criterion. The data service may be configured to generate a summary or highlight video, including to access information in at least some of the enhanced metadata nodes to select one or more video portions for the summary or highlight video. The data service may be configured to assemble data from one or more data sources into an enhanced metadata node.

The client may receive the subset of the enhanced metadata nodes and cache the subset as part of a client graph.

One or more aspects are directed towards receiving a portion of a streamed video at a client device and receiving enhanced metadata at the client device, in which the enhanced metadata corresponds to the portion of the streamed video. Described herein is caching the enhanced metadata in a client device cache, and allowing user interaction with information in the enhanced metadata. Receiving the portion of the streamed video and receiving the enhanced metadata corresponding to the portion of the streamed video may occur in parallel or substantially in parallel at the client device. At least some other enhanced metadata may be removed from the client device cache according to an enhanced metadata eviction policy.

Also described herein is the ability to send a search request including search scope information and one or more search criteria to an entity that provides the enhanced metadata, and receiving a search result from the entity. The search result may be based upon a search of the enhanced metadata within the search scope, in which the search result includes information identifying at least one video portion that meets the one or more search criteria.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Servers including physical and/or virtual machines are likewise suitable devices/machines. Accordingly, the general purpose computing mechanism described below in FIG. 11 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 11:
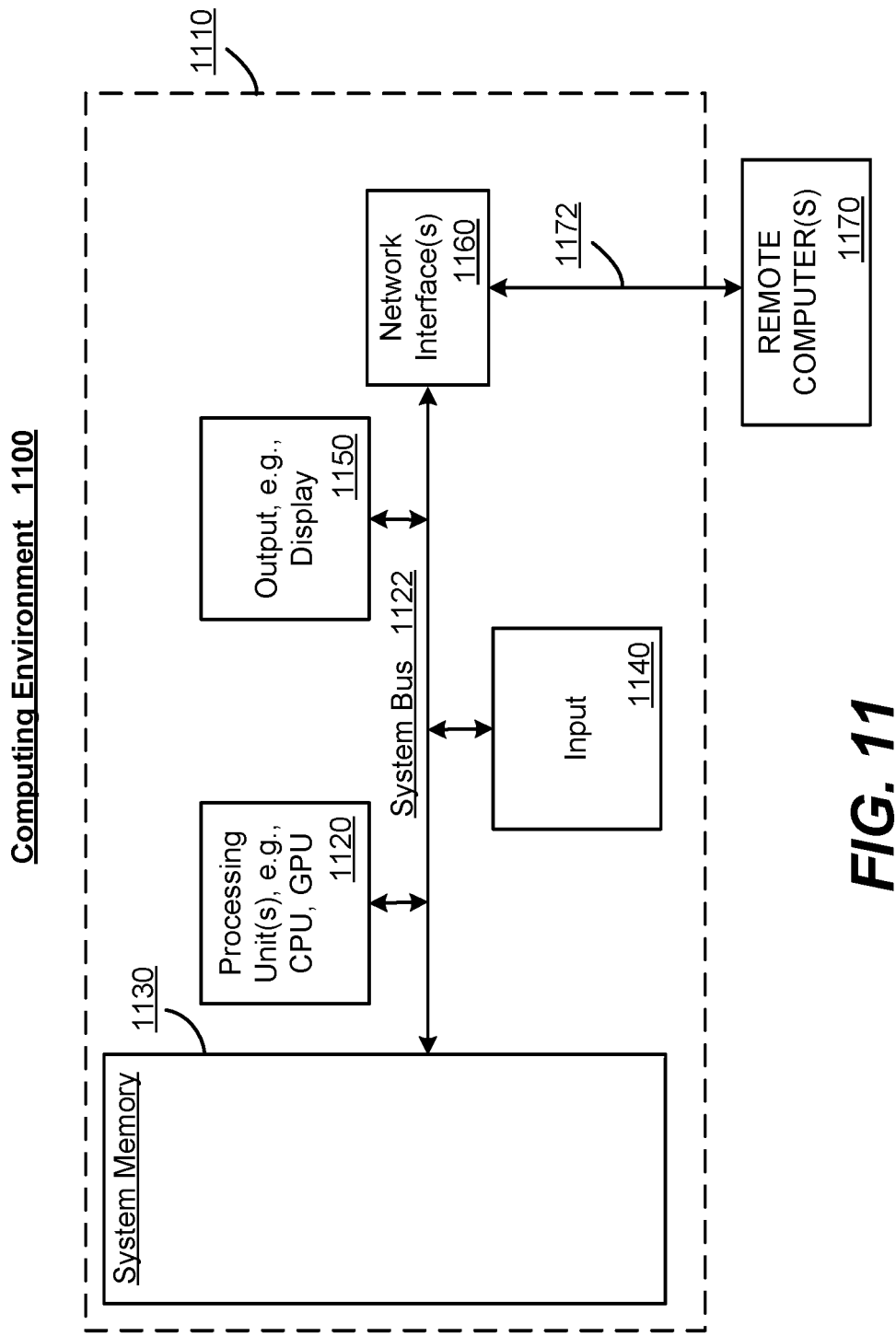
FIG. 11 is a block diagram representing an example computing environment, according to one or more example implementations, into which aspects of the subject matter described herein may be incorporated.

FIG. 11 thus illustrates an example of a suitable computing system environment 1100 in which one or aspects of the implementations described herein can be implemented, although as made clear above, the computing system environment 1100 is only one example of a suitable computing environment and is not intended to suggest any limitation as to scope of use or functionality. In addition, the computing system environment 1100 is not intended to be interpreted as having any dependency relating to any one or combination of components illustrated in the example computing system environment 1100.

With reference to FIG. 11, an example device for implementing one or more implementations includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 typically includes a variety of machine (e.g., computer) readable media and can be any available media that can be accessed by a machine such as the computer 1110. The system memory 1130 may include computer storage media in the form of volatile and/or nonvolatile memory such as read only memory (ROM) and/or random access memory (RAM), and hard drive media, optical storage media, flash media, and so forth. By way of example, and not limitation, system memory 1130 may also include an operating system, application programs, other program modules, and program data.

A user can enter commands and information into the computer 1110 through one or more input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method comprising:
    relating subevent portions of a video with subsets of enhanced metadata, each subset of the enhanced metadata describing at least one action performed by a character in a corresponding subevent portion of the video, wherein the subevent portions of the video are more granular than a scene of the video;
    streaming the video to a client device in a first stream;
    determining which subevent portion of the video is being streamed;
    selecting a subset of the enhanced metadata that corresponds to the subevent portion of the video being streamed resulting in a selected subset; and
    streaming the selected subset of the enhanced metadata to the client device in a second stream concurrently with the subevent portion of the video being streamed to the client device in the first stream.

2. The method of claim 1, wherein the enhanced metadata is configurable as nodes of a graph, wherein determining which subevent portion of the video is being streamed comprises determining a set of frames, and wherein the selecting the selected subset of the enhanced metadata that corresponds to the subevent portion of the video being streamed comprises selecting at least one enhanced metadata node based upon the set of frames.

3. The method of claim 2, wherein selecting the selected subset of the enhanced metadata comprises selecting at least one enhanced metadata node that includes information describing an action in the corresponding subevent portion of the video.

4. The method of claim 2, wherein selecting the selected subset of the enhanced metadata comprises selecting at least one enhanced metadata node that includes information describing a character or a location, or both a character and a location, in the corresponding subevent portion of the video.

5. The method of claim 1, further comprising, receiving a request to search for information within the enhanced metadata, determining a search scope based upon the request, determining one or more in-scope subsets of the enhanced metadata to search based upon the search scope, searching the one or more in-scope subsets for matching information based upon one or more search criteria in the request, and returning a response to the request that identifies any matching information determined by the searching.

6. The method of claim 1, further comprising, receiving a request to generate a summary or highlight video, locating one or more relevant subsets of the enhanced metadata corresponding to the summary or highlight video, and using information in the one or more relevant subsets to generate the summary or highlight video.

7. The method of claim 1, further comprising, before streaming the video to the client device, downloading at least one subset of the enhanced metadata to the client device based upon user interaction, rendering a visible representation of at least part of the subset of the enhanced metadata on the client device, and allowing user interaction with the visible representation.

8. The method of claim 1, wherein the subevent portions are correlated with a camera action.

9. A system comprising:
    a processor; and
    a memory communicatively coupled to the processor, the memory having stored therein computer-executable instructions, comprising:
        a data service of a video content provider, the data service configured to:
            relate subevent portions of a video with subsets of enhanced metadata nodes, each subset of the enhanced metadata nodes describing at least one action performed by a character in a corresponding subevent portion of the video wherein the subevent portions of the video are within a scene of the video;
            stream the video to a client device in a first stream;
            determine which subevent portion of the video is being streamed;
            select a subset of the enhanced metadata nodes that corresponds to the subevent portion of the video being streamed resulting in a selected subset; and
            stream the selected subset of the enhanced metadata nodes to the client device in a second stream concurrently with the subevent portion of the video being streamed to the client device in the first stream.

10. The system of claim 9, wherein the enhanced metadata nodes comprise at least one of: a chapter node, a scene node, a cut node or an event node, or any combination of a chapter node, a scene node, a cut node or an event node.

11. The system of claim 9, wherein the enhanced metadata nodes comprise at least two or more alternate nodes that are both relevant to a same subevent portion of the video.

12. The system of claim 9, wherein the selected subset of the enhanced metadata nodes that is relevant to the subevent portion of the video describe the subevent portion of the video with information corresponding to at least one verb and one noun.

13. The system of claim 9, wherein the data service is configured to search at least some of the enhanced metadata nodes to identify one or more subevent video portions that match search criteria or a search criterion.

14. The system of claim 9, wherein the data service is configured to generate a summary or highlight video, including to access information in at least some of the enhanced metadata nodes to select one or more subevent video portions for the summary or highlight video.

15. The system of claim 9, wherein the data service is configured to assemble data from one or more data sources into an enhanced metadata node.

16. The system of claim 9, wherein the client device receives the selected subset of the enhanced metadata nodes and caches the subset as part of a client graph.

17. The system of claim 9, wherein the subevent portions depict little or no movement.

18. A non-transitory computer-readable medium having instructions stored thereon that, in response to execution, cause a system including a processor to perform operations comprising:
receiving a subevent portion of a scene of a streamed video at a client device in a first stream;
receiving, concurrently with receiving the first stream, enhanced metadata at the client device in a second stream, the enhanced metadata describing an action performed by a character in the subevent portion of the scene of the streamed video;
caching the enhanced metadata in a client device cache; and
allowing user interaction with information in the enhanced metadata.

19. The non-transitory computer-readable medium of claim 18, having further machine-executable instructions comprising, removing at least some other enhanced metadata from the client device cache according to an enhanced metadata eviction policy.

20. The non-transitory computer-readable medium of claim 18, having further machine-executable instructions comprising, sending a search request including search scope information and one or more search criteria to an entity that provides the enhanced metadata, and receiving a search result from the entity that is based upon a search of the enhanced metadata within the search scope, in which the search result includes information identifying at least one subevent video portion that meets the one or more search criteria.

21. The non-transitory computer-readable medium of claim 18, wherein the subevent portion is associated with a camera action or depicts no on-screen movement.

* * * * *